No. 663,760. Patented Dec. 11, 1900.
A. JOHNSON.
MAGNETIC ORE SEPARATOR.
(Application filed Feb. 2, 1900.)
(No Model.) 2 Sheets—Sheet 1.
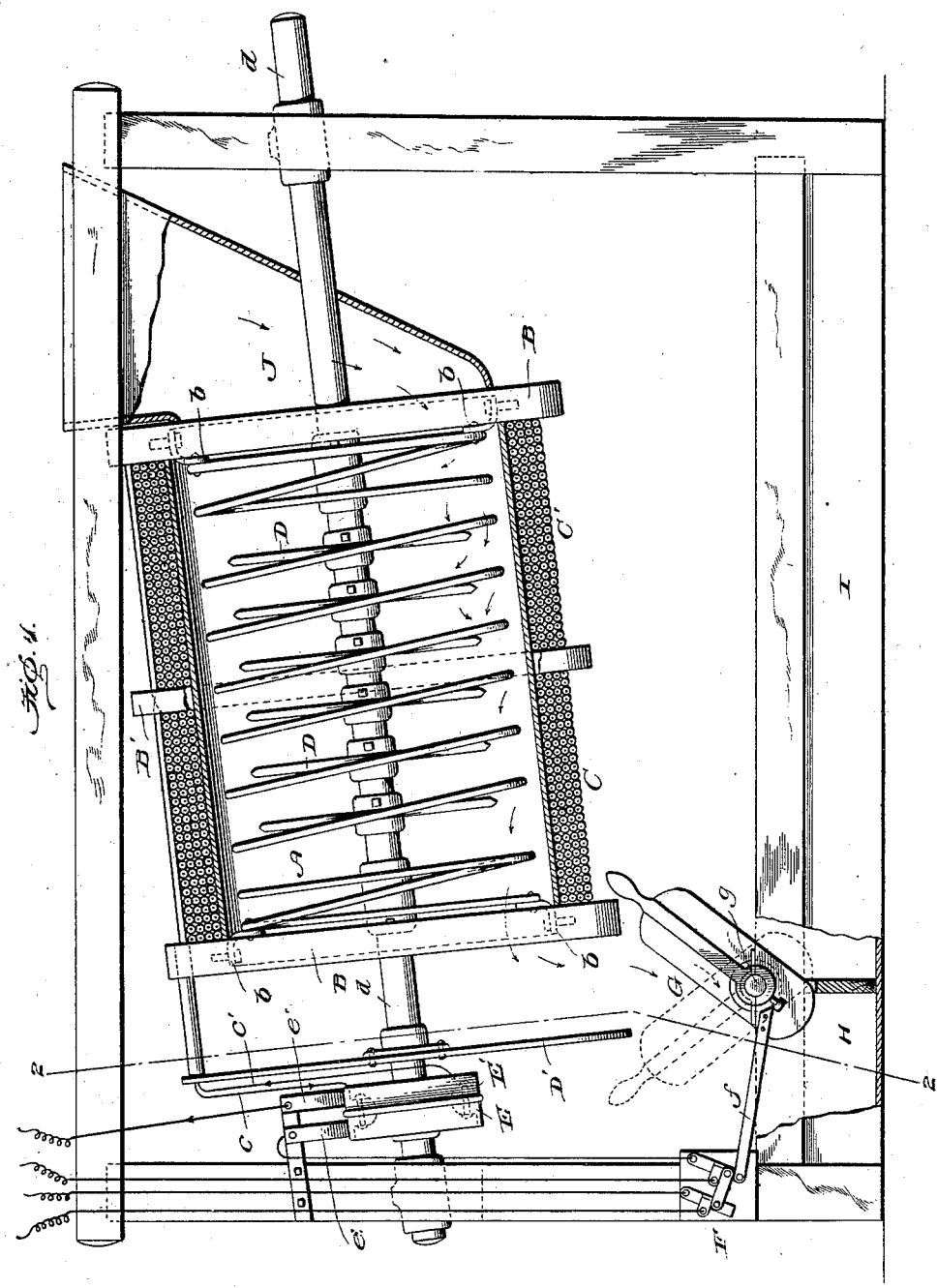

No. 663,760. Patented Dec. 11, 1900.
A. JOHNSON.
MAGNETIC ORE SEPARATOR.
(Application filed Feb. 2, 1900.)
(No Model.) 2 Sheets—Sheet 2.
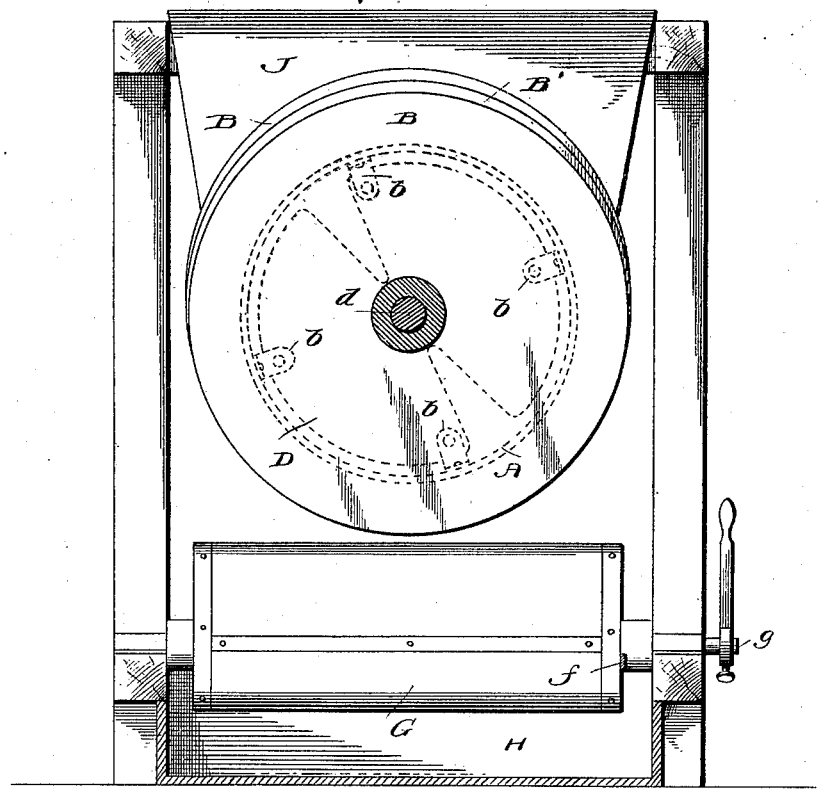
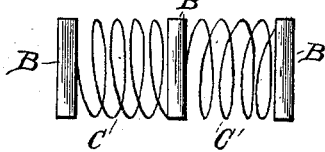
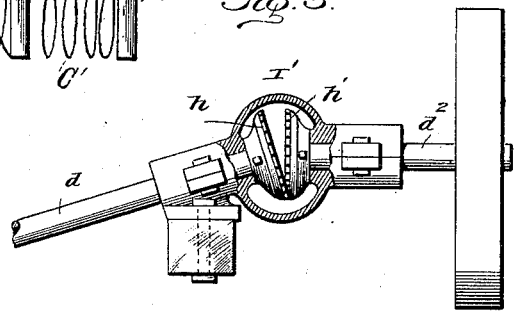
Witnesses: 
Inventor
August Johnson
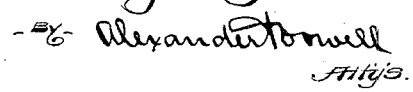

UNITED STATES PATENT OFFICE.

AUGUST JOHNSON, OF MOLINE, ILLINOIS, ASSIGNOR TO THE BARNARD & LEAS MANUFACTURING COMPANY, OF SAME PLACE.

MAGNETIC ORE-SEPARATOR.

SPECIFICATION forming part of Letters Patent No. 663,760, dated December 11, 1900.

Application filed February 2, 1900. Serial No. 3,757. (No model.)

*To all whom it may concern:*

Be it known that I, AUGUST JOHNSON, of Moline, in the county of Rock Island and State of Illinois, have invented certain new and useful Improvements in Magnetic Ore-Separators; and I hereby declare that the following is a full, clear, and exact description thereof, reference being had to the accompanying drawings, which form part of this specification.

This invention is an improvement in magnetic ore-separators; and the invention consists, briefly, of a solenoid or a metallic cylinder preferably made of soft iron and wrapped exteriorly with a series of wire coils, the alternate coils or sections being preferably wound oppositely to each other, so as to produce points of greatest magnetic intensity intermediate the ends of the cylinder. Within this solenoid or cylinder, which is preferably rotatable, is arranged a series of magnets or ore-collectors, which may be made in the form of conveyer-blades and mounted upon an axial shaft within the solenoid or cylinder, thus being adapted to perform the functions of regulating and controlling the passage of material through the solenoid and of also attracting and retaining within the solenoid the particles of magnetic materials or substances in the ores, &c., passing through the solenoid, while the non-magnetic substances are freely discharged therefrom. Preferably these "conveyer-magnets," as they may be termed, are made of soft iron, so as to be quickly and strongly magnetized by induction; but their chief function and object is to draw the magnetizable particles away from the inner periphery of the solenoid or cylinder and collect the same in the interior thereof. The effectiveness of the machine is thus greatly increased, because the particles adhering to the interior magnets will not be subjected to the sweeping action of the non-magnetic substances passing through the solenoid, which tend to force the particles of ore, &c., adhering to the inner circumference of the solenoid or cylinder out of the latter. This arrangement of magnets within the solenoid, so as to attract and collect particles around the axis thereof rather than around the inner circumference thereof (or in addition to the collection of the magnetic particles around the inner circumference of the solenoid) is deemed one of the most meritorious features of the invention, and while I think the magnets shown in the drawings, which will act both as regulators for the control of the flow of material through the solenoid and as collectors for the magnetic particles, very useful, nevertheless I do not confine myself to the employment of magnets which will perform both functions. Neither do I wish to be restricted to the employment of magnets magnetized only by induction within the cylinder. The machine shown in the drawings is also provided with means whereby after a sufficient quantity of magnetic particles has been collected the current may be cut off from the solenoid, whereupon both it and its interior magnets are demagnetized, and consequently the magnetic particles adhering thereto will be dropped into the cylinder and discharged therefrom. The switch for controlling the current may be opened and closed by the shifting of a chute which is used to direct the material flowing through the cylinder into the waste or into an ore-receptacle, the circuit being closed when the chute is shifted so as to discharge material into the waste and being opened when the chute is shifted so as to discharge the magnetic particles into the ore-box.

The accompanying drawings illustrate a practical apparatus embodying the invention in the best form now known to me, and I will describe the invention as embodied in said machine with reference to the accompanying drawings, which illustrate the same.

Figure 1 is a longitudinal vertical section through said machine; and Fig. 2 is a transverse section through the same on line 2 2, Fig. 1. Fig. 3 is a detail, partly in section, showing one means for rotating the cylinder. Fig. 4 is a small diagrammatic view illustrating the opposite windings of the coils of the solenoid.

A designates a metallic cylinder, which is preferably of soft metal and is connected to annular heads B, whose surface may be exteriorly divided into a plurality of longitudinal sections by a metal ring or rings B'. On the exterior of the cylinder and between the ring B' and heads B are wound coils of wire C C', coil C' being preferably wound oppositely to coil C, so as to produce the strongest magnetic field at the most effective point in the machine. As shown, there are two coils on the cylinder, but obviously more coils may be used with a longer cylinder, in which case additional rings B' would be employed between the coils, of course. The cylinder is preferably rotatable and for convenience may be mounted upon a shaft $d$, suitably journaled in the framework, and may be provided with any convenient means for rotating the same. As shown, a series of disk or conveyer shaped magnets D is secured upon shaft $d$ within the cylinder, which is virtually the interior shell of a solenoid formed by the coils C C'. The heads B may be supported on the shaft $d$ by means of the brackets $b$, attached to the end magnets and to the heads, as shown or in any other convenient manner.

The conveyer-magnets D are preferably made of soft iron and will perform the double function of regulating the flow of material through the machine and of collecting the metallic particles of ore, &c., passing through the solenoid, these magnets acting to attract the particles toward the center of the solenoid and away from the inner circumference thereof, thus retaining the metallic particles in the position where they are the least liable to be carried out of the solenoid by the passage of the non-magnetic particles therethrough, which have a tendency to sweep the magnetic particles adhering to the inner circumference of the solenoid out of the latter. These magnets greatly increase the separating capacity of the machine, because obviously a much greater amount of material can be collected by means of these interior or axially-arranged magnets than could be secured by the use of the solenoid alone or of circumferentially-arranged magnets.

The current is conveyed to the coils C C' by means of suitable wires $c\ c'$, which are supported by a disk D' and connected to the opposite segments E E' of a commutator on shaft $d$, which receives current from brushes $e\ e'$, which are respectively electrically connected with a suitable source of electricity. It will be noted that a double switch F is shown in the drawings interposed in the circuit. This is not ordinarily necessary, but is useful where small shunt-wound dynamos are used to operate these separators. In such case the double switch is used to bring a rheostat into the circuit to prevent undue excitement of the fields on the machine while the circuit through the solenoid is closed. The particular switch and electrical connections do not, however, form part of the present invention; but the switch F is operated automatically from the chute G, which is pivoted below the discharge end of the solenoid, as shown at $g$, and is connected to the switch by a link $f$. When the chute G is turned so as to discharge the material issuing from the cylinder into the waste-box or conduit H, the switch F is thereby shifted into position to close the circuit through the coils and magnetize the solenoid, and thereby magnetize magnets D by induction.

When the chute G is turned, as indicated in dotted lines, so as to throw the material into the ore-box I, the switch F is opened, and consequently the circuit is broken and the solenoid and magnets are demagnetized, whereupon the iron or magnetic articles adhering thereto will be dropped and discharged from the cylinder onto the chute and into the metallic box.

Preferably the solenoid or cylinder is inclined toward the discharge end, so that the material can be fed easily thereinto at the higher end thereof from hopper J and be discharged from the lower end thereof onto the chute G.

In Fig. 3 I have shown one means for rotating the cylinder, which is accomplished by angle-gears. On the outer end of shaft $d$ is keyed a gear $h$, and meshing therewith is a similar gear $h'$, also keyed to a short horizontal shaft $d^2$. A suitable housing I' is provided for said gears, as shown, and in which said gears are loosely journaled in bearings provided therefor. Of course I do not wish to limit myself to this construction for rotating the cylinder, as this may be done in any convenient manner. For instance, the cylinder may be driven with bevel-gears, belt, and idle pulleys.

I would further remark that the divisions or dividing-rings between the separate coils of the solenoid are preferably made of non-magnetic material. While this is not necessary or material, yet it is found desirable, as it will not cause magnetic particles to be deposited in and around the coils on the outside of the machine.

The operation of the apparatus will be readily understood from the foregoing description, and it is obvious that various changes can be made therein within the scope of the invention, which is not limited to the specific form of apparatus herein shown and described.

Having thus described my invention, what I therefore claim as new, and desire to secure by Letters Patent thereon, is—

1. In a magnetic separator, the combination of a solenoid through which the material to be separated is passed, and a series of magnets arranged within the solenoid and out of contact with the inner circumference thereof.

2. In an ore-separating apparatus, the combination of a cylinder through which the material to be separated is passed, a solenoid inclosing the cylinder, and a series of magnets arranged within the cylinder adapted to attract the magnetic particles and hold them away from the inner circumference of the cylinder.

3. In an ore-separating apparatus, the combination of a rotatable cylinder through which material to be separated is passed and a solenoid inclosing the cylinder; with a series of axially-disposed magnets within the cylinder adapted to attract the magnetic particles and hold them away from the inner circumference of the cylinder.

4. In a magnetic separator, the combination of a solenoid through which the material to be separated is passed; with a series of magnetizable bodies arranged within the solenoid adapted to be magnetized by induction and attract and suspend magnetizable particles passing therethrough.

5. In a magnetic separator, the combination of a cylinder through which the material to be separated is passed; with a series of magnets arranged therein and adapted to serve as conveyer-blades to push the material through the cylinder, and also to attract magnetic particles and hold them away from the inner circumference of the cylinder, substantially as described.

6. In a magnetic separator, the combination of a solenoid through which the material is to be passed, with a series of soft-metal blades in the solenoid adapted to be magnetized by induction and to serve as conveyers for the material, substantially as described.

7. In a magnetic separator, the combination of a solenoid through which material to be separated is passed; with a series of magnetizable conveyer-blades arranged within the cylinder and adapted to attract and suspend magnetizable particles passing therethrough.

8. In a magnetic separator, the combination of a solenoid through which the material is to be passed; with a series of soft-metal conveyer-blades axially disposed in the cylinder and adapted to be magnetized by induction, substantially as described.

9. In a magnetic separator, the combination of a cylinder, the coils surrounding the same and a series of magnets within the cylinder separated from the walls thereof.

10. In a magnetic separator, the combination of a cylinder, a solenoid surrounding the same and a series of soft-metal conveyer-blades arranged axially within the cylinder and adapted to be magnetized by induction.

11. In a magnetic separator, the combination of a solenoid, and an interior series of magnets arranged within but out of contact with the inner circumference of the solenoid, and means for making and breaking the circuit through the coils of the solenoid.

12. In a magnetic separator, the combination of a solenoid composed of a plurality of oppositely-wound coils arranged end to end, and an interior series of magnets arranged within but out of contact with the inner circumference of the solenoid, and means for making and breaking the circuit through the coils of the solenoid.

13. In a magnetic separator, the combination of a solenoid and a series of bodies arranged within the solenoid but out of contact with the inner circumference thereof and adapted to be magnetized by induction, and means for making and breaking the circuit through the coils of the solenoid.

14. In a magnetic separator, the combination of a solenoid composed of a plurality of oppositely-wound coils arranged end to end, and an axially-disposed series of soft-metal bodies arranged within the solenoid but out of contact with the inner circumference thereof and adapted to be magnetized by induction, and means for making and breaking the circuit through the coils of the solenoid.

15. In a magnetic separator, the combination of the cylinder, the solenoid inclosing the same, and means for making and breaking the circuit through the coils; with a series of soft-metal bodies arranged within the cylinder and adapted to be magnetized by induction.

16. In a magnetic separator, the combination of the cylinder, the solenoid inclosing the same composed of oppositely-wound coils arranged end to end; with a series of soft-metal bodies arranged within the cylinder and adapted to be magnetized by induction, and means for making and breaking the circuit.

17. In a magnetic separator, the combination of the soft-metal cylinder, the solenoid inclosing the same and composed of oppositely-wound coils arranged end to end; with a series of soft-metal conveyer blades or bodies arranged axially within the cylinder and adapted to be magnetized by induction, and means for making and breaking the circuit.

18. In an ore-separator, the combination of a solenoid through which material to be separated is passed, a switch and connections for making and breaking the circuit through the solenoid, a movable chute below the discharge end of the solenoid, and connections whereby said switch is operated by and from said chute.

19. In a magnetic separator, the combination of a solenoid, and an interior series of magnets arranged within but out of contact with the inner circumference of the solenoid, and means for making and breaking the circuit through the coils of the solenoid; with a movable chute below the discharge end of the solenoid, and connections between said chute and said make-and-break device whereby the latter is operated by the movement of the chute.

20. In a magnetic separator, the combination of a solenoid composed of a plurality of oppositely-wound coils arranged end to end, and an interior series of magnets arranged within but out of contact with the inner circumference of the solenoid, and means for making and breaking the circuit through the coils of the solenoid; with a movable chute below the discharge end of the solenoid, and connections between said chute and said make-and-break device whereby the latter is operated by the movement of the chute, substantially as described.

21. In a magnetic separator, the combination of a solenoid composed of a plurality of oppositely-wound coils arranged end to end, and a series of soft-metal bodies arranged within the solenoid, and adapted to be magnetized by induction, and means for making and breaking the circuit through the coils of the solenoid; with a movable chute below the discharge end of the solenoid and connections between said chute and said make-and-break device whereby the latter is operated by the movement of the chute.

22. In a magnetic separator, the combination of a solenoid composed of a plurality of oppositely-wound coils arranged end to end, a series of soft-metal bodies arranged within the solenoid, but out of contact with the inner circumference thereof adapted to be magnetized by induction, and a switch for making and breaking the circuit through the coils of the solenoid; with a movable chute below the discharge end of the solenoid and connections between said chute and said switch whereby the latter is operated by the movement of the chute.

23. In a magnetic separator, the combination of the soft-metal cylinder, the solenoid inclosing the same and composed of oppositely-wound coils arranged end to end, a switch for making and breaking the circuit through the coils, a series of soft-metal conveyer blades or bodies arranged axially within the cylinder and adapted to be magnetized by induction, and means for making and breaking the circuit; with a chute below the discharge end of the solenoid and connections between said chute and said switch whereby said switch is operated by the movement of the chute.

In testimony that I claim the foregoing as my own I affix my signature in presence of two witnesses.

AUGUST JOHNSON.

In presence of—
JOHN B. CORNWALL,
ABRAM H. JOSEPH.